United States Patent
Bai et al.

(10) Patent No.: US 10,699,433 B2
(45) Date of Patent: Jun. 30, 2020

(54) LIQUID LEVEL DETECTING METHOD AND DEVICE USING THE SAME

(71) Applicant: INDUSTRIAL TECHNOLOGY RESEARCH INSTITUTE, Hsinchu (TW)

(72) Inventors: Jia-Hao Bai, Taichung (TW); Tzu-Hang Huang, Taipei (TW); Chun-Jen Chen, Zhubei (TW); Cheng-Hsun Lin, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 75 days.

(21) Appl. No.: 16/199,064

(22) Filed: Nov. 23, 2018

(65) Prior Publication Data

US 2020/0082558 A1 Mar. 12, 2020

(30) Foreign Application Priority Data

Sep. 12, 2018 (TW) .............................. 107132130 A (51) Int. Cl.
*G06K 9/00* (2006.01)
*G06T 7/62* (2017.01)
*G06T 7/73* (2017.01)

(52) U.S. Cl.
CPC .................. *G06T 7/62* (2017.01); *G06T 7/74* (2017.01); *G06T 2207/30204* (2013.01)

(58) Field of Classification Search
CPC .... G06T 7/62; G06T 7/74; G06T 2207/30204
(Continued)

(56) References Cited

U.S. PATENT DOCUMENTS 6,098,029 A * 8/2000 Takagi ...................... G06T 7/60
382/100
8,184,848 B2 * 5/2012 Wu .......................... G06K 9/00
382/100

(Continued)

FOREIGN PATENT DOCUMENTS

| CN | 102165288 B | 3/2013 |
|---|---|---|
| CN | 103134568 B | 9/2015 |

(Continued)

OTHER PUBLICATIONS

Extended European Search Report dated Jul. 11, 2019 for Application No. 19151932.1.

(Continued)

*Primary Examiner* — Jonathan S Lee
(74) *Attorney, Agent, or Firm* — Birch, Stewart, Kolasch & Birch, LLP (57) ABSTRACT

A liquid level detecting method is provided. Firstly, a receiving component is provided, wherein the receiving component includes a transmissive container for containing a liquid and a marking component located on a rear surface of the transmissive container. Then, a camera captures a receiving component image of the receiving component from a front surface of the transmitting container, wherein the receiving component image includes a transmissive container image and a marking component image. Then, the marker component image is analyzed downward from an end portion to obtain multiple width values of multiple position points of the marker component image. Then, a width difference between each width value and a width average of the marking component image is obtained. Then, a position point whose width difference value is not within a preset range is determined. Then, according to the position point, a liquid level of the liquid is determined.

20 Claims, 10 Drawing Sheets

(58) Field of Classification Search
USPC .......................................................... 382/103
See application file for complete search history.

(56) References Cited

U.S. PATENT DOCUMENTS

| | | | | |
|---|---|---|---|---|
| 8,338,811 | B2* | 12/2012 | Lang | G01F 23/2925 |
| | | | | 250/577 |
| 8,345,924 | B2* | 1/2013 | Wang | G01F 23/686 |
| | | | | 340/500 |
| 8,630,449 | B2* | 1/2014 | Choo | G08B 21/18 |
| | | | | 382/100 |
| 9,459,130 | B2* | 10/2016 | Bradshaw | G01F 23/0076 |
| 9,846,032 | B2* | 12/2017 | Ladd | G01B 13/16 |
| 10,078,070 | B2* | 9/2018 | Hashimoto | G01N 21/253 |
| 10,527,480 | B2* | 1/2020 | Cipullo | G01F 23/292 |
| 2006/0178578 | A1 | 8/2006 | Tribble et al. | |
| 2010/0322462 | A1 | 12/2010 | Wu et al. | |
| 2015/0002658 | A1 | 1/2015 | Jaw et al. | |
| 2016/0116323 | A1 | 4/2016 | Omegna De Souza Filho | |
| 2018/0068460 | A1 | 3/2018 | Huang et al. | |

FOREIGN PATENT DOCUMENTS

| | | |
|---|---|---|
| CN | 205192571 U | 4/2016 |
| EP | 2520909 A1 | 11/2012 |
| JP | 2005-291830 A | 10/2005 |
| TW | I590190 B | 7/2017 |
| TW | I608221 B | 12/2017 |
| WO | WO 2011/062352 A1 | 5/2011 |

OTHER PUBLICATIONS

Taiwanese Office Action, dated Jun. 28, 2019, for Taiwanese Application No. 107132130.

"Cerebrospinal Fluid (CSF) Management Market (Product—CSF Shunts and CSF Drainage Systems)—Global Industry Analysis, Size, Share, Growth, Trends, and Forecast 2015-2023", https://www.transparencymarketresearch.com/csf-management-market.html, total of 33 pages.

* cited by examiner

LIQUID LEVEL DETECTING METHOD AND DEVICE USING THE SAME

CROSS-REFERENCE TO RELATED APPLICATION

This application claims the benefit of Taiwan application Serial No. 107132130, filed Sep. 12, 2018, the subject matter of which is incorporated herein by reference.

TECHNICAL FILED

The invention relates in general to a liquid level detecting method and a liquid level detecting device using the same.

BACKGROUND

Generally speaking, the external ventricular drainage system includes a container and a pressure valve connecting the container to a brain chamber. When the brain pressure inside the brain chamber is too large, the pressure valve will be opened, such that the liquid inside the brain chamber can be drained to the container. Different medical orders are provided in response to the change in the liquid level (the brain fluid volume) of the brain fluid inside the container. The medical staff need to be on site to physically observe the change in the liquid level of the brain fluid inside the container and determine what corresponding medical order needs to be taken.

Therefore, how to provide a device or a method capable of automatically detecting relevant change in liquid level has become a prominent task for the industries.

SUMMARY

According to an embodiment of the present invention, a liquid level detecting method. The liquid level detecting method includes the following steps. Firstly, a transmissive container image of a transmissive container and a marking component image of a marking component are captured by a camera from a front surface of the transmissive container, wherein the transmissive container is configured for containing a liquid, and the marking component is located on a rear surface of the transmissive container. Then, the marker component image is analyzed downward from an end portion of the marker element image to obtain a plurality of width values of a plurality of position points of the marker component image. Then, a width difference between each width value and a width average of the marking component image is obtained. Then, a position point whose width difference value is not within a preset range is determined as the liquid level of the liquid.

According to another embodiment of the present invention, a liquid level detecting device is provided. The liquid level detecting device is configured for detecting a liquid level of a liquid contained in a transmissive container. A marking component is located on a rear surface of the transmissive container. The liquid level detecting device includes a camera, an image analyzer and a liquid level determiner. The camera is configured for capturing a transmissive container image of the transmissive container and a marking component image of the marking component from a front surface of the transmissive container. The image analyzer is configured for analyzing the marking component image downward from an end portion of the marking component image to obtain a plurality of width values of a plurality of position points of the marker component image and obtaining a width difference between each width value and a width average of the marking component image. The liquid level determiner is configured for determining a position point whose width difference is not within a preset range as the liquid level of the liquid.

The above and other aspects of the invention will become better understood with regard to the following detailed description of the preferred but non-limiting embodiment(s). The following description is made with reference to the accompanying drawings.

DETAILED DESCRIPTION OF THE EMBODIMENTS

Figure 1:
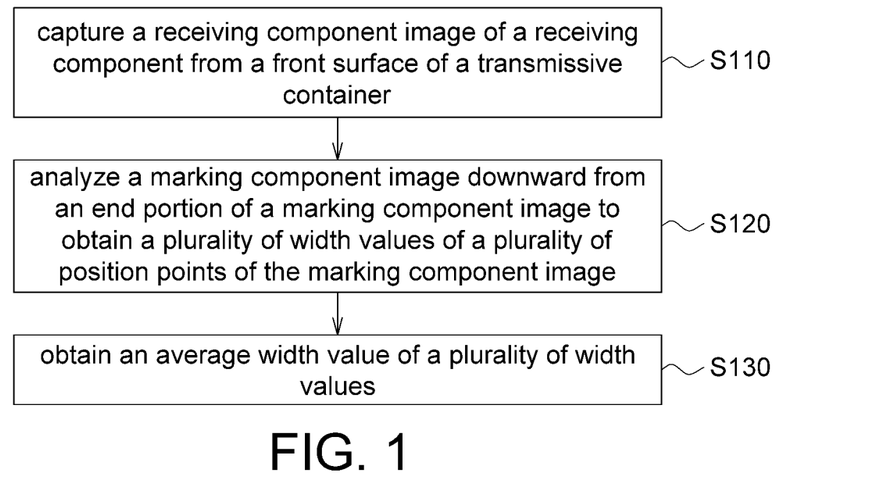
FIG. 1 is a flowchart of obtaining a width average of a marking component image according to an embodiment of the present disclosure.
Figure 2A:
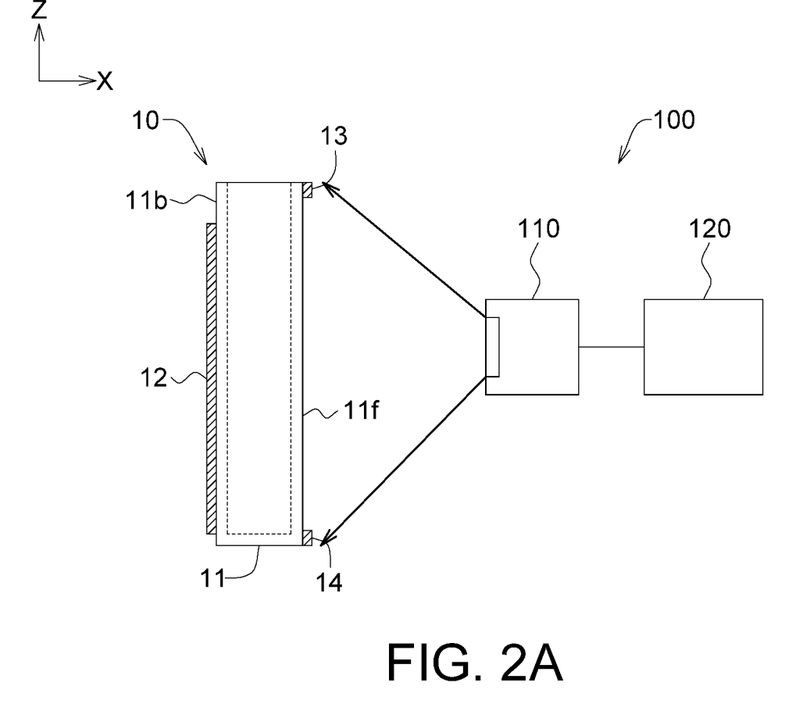
FIG. 2A is a schematic diagram of a liquid level detecting device according to an embodiment of the present disclosure.
Figure 2B:
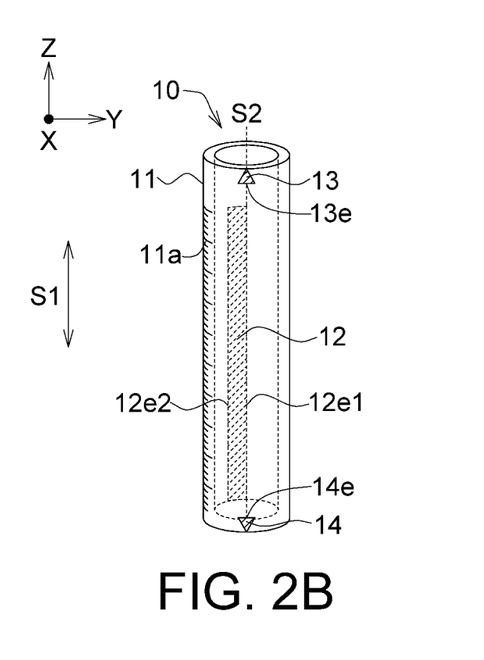
FIG. 2B is a schematic diagram of a transmissive container viewed from a front surface of the transmissive container of FIG. 2A.
Figure 2C:
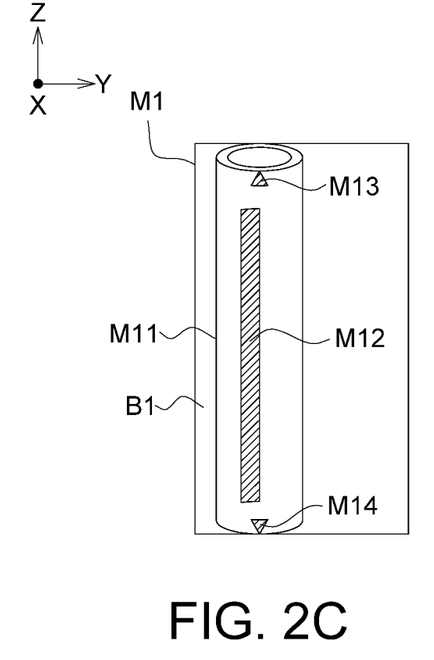
FIG. 2C is a schematic diagram of a receiving component image captured by the camera of FIG. 2A from a front surface of a transmissive container 11.
Figure 2D:
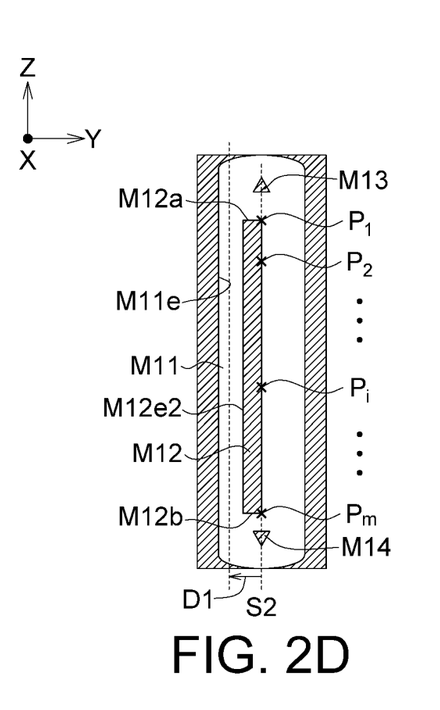
FIG. 2D is a schematic diagram of the marking component image, the first mark image and the second mark image of FIG. 2C.
Figure 2E:
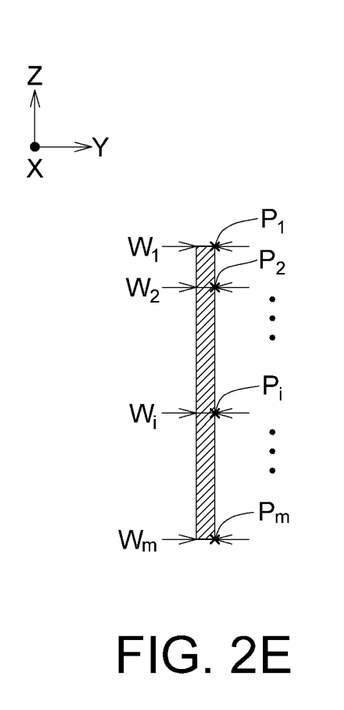
FIG. 2E is a schematic diagram of a width of the marking component image of FIG. 2D.

Refer to FIG. 1 and FIGS. 2A~2E. FIG. 1 is a flowchart of obtaining a width average $W_{av}$ of a marking component image M12 according to an embodiment of the present disclosure. FIG. 2A is a schematic diagram of a liquid level detecting device 100 according to an embodiment of the present disclosure. FIG. 2B is a schematic diagram of a transmissive container viewed from a front surface 11$f$ of the transmissive container of FIG. 2A. FIG. 2C is a schematic diagram of a receiving component image M1 captured by the camera of FIG. 2A from a front surface 11$f$ of a transmissive container 11. FIG. 2D is a schematic diagram of the marking component image M12, the first mark image and the second mark image of FIG. 2C. FIG. 2E is a schematic diagram of a width of the marking component image M12 of FIG. 2D.

Figure 4A:
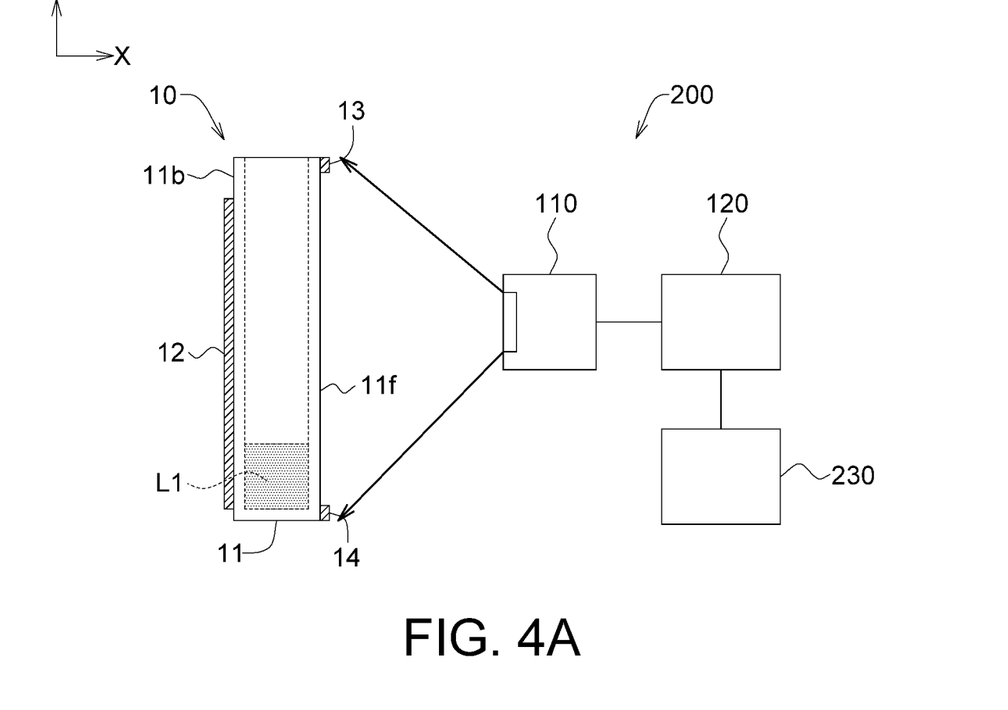
FIG. 4A is a schematic diagram of the liquid contained in the transmissive container of FIG. 2A being at a low liquid level.

As indicated in FIG. 2A, the liquid level detecting device 100 includes a camera 110 and an image analyzer 120. The liquid level detecting device 100 is configured for detecting a liquid level of a liquid L1 contained in the transmissive container 11 (the liquid L1 is illustrated in FIG. 4A). The liquid level detecting device 100 can be used in medical field such as the external ventricular drainage system for automatically determining the liquid level of the liquid drained to the transmissive container 11 from the brain chamber. In another embodiment, the liquid level detecting device 100 can be used outside the medical field. The liquid level detecting method and the liquid level detecting device using the same disclosed in the embodiments of the present disclosure can be used in any application fields in which corresponding operation is taken according to the observation of the liquid level.

As indicated in FIG. 2A, the receiving component 10 includes a transmissive container 11, in which a liquid L1 (the liquid L1 is illustrated in FIG. 4A) is contained, and a marking component 12 located on a rear surface 11$b$ of the transmissive container 11. The transmissive container 11 can be realized by a measuring cylinder, a drip-feeding bottle or any liquid container, and the liquid can be body fluid, liquid medicine, water, nutrient solution or other suitable liquid. In the present embodiment, the color of the marking component 12 and that of the transmissive container 11 can be differentiated from each other. For example, the color of the marking component 12 can be darker than that of the transmissive container 11, and can be black, blue or other suitable color.

In the present embodiment as indicated in FIGS. 2A and 2B, the receiving component 10 further includes a first mark 13 and a second mark 14, wherein the first mark 13 and the second mark 14 are located on a front surface 11$f$ of the transmissive container 11. Additionally, the first mark 13, the second mark 14 and the marking component 12 are separated from one another. Viewing towards the front surface 11$f$ as indicated in FIG. 2B, the marking component 12 is located between the first mark 13 and the second mark 14; the first mark 13, the second mark 14 and the marking component 12 are separated from one another and do not overlap at all. Besides, the color of the first mark 13 and the second mark 14 can be similar or identical to that of the marking component 12, and is not repeated here. As indicated in FIG. 2B, the transmissive container 11 has a scale 11$a$. The scale 11$a$ can be located on a lateral side of the transmissive container 11, such that the scale 11$a$ is least seen (or cannot be seen) in the diagram of the transmissive container viewed from the front surface 11$f$ (such as FIG. 2B). Thus, the scale image (if any) will not affect the determination of the liquid level in subsequent step of image analysis.

As indicated in FIG. 2B, the extending direction S1 of the marking component 12 is substantially parallel to the direction of the connection line S2 connecting the first mark 13 and the second mark 14. In the present embodiment as indicated in FIG. 2B, the first mark 13 is a first triangle; the second mark 14 is a second triangle; the bottom side 13$e$ of the first mark 13 and the bottom side 14$e$ of the second mark 14 are opposite to each other. Furthermore, viewing towards the front surface 11$f$, the connection line S2 connecting the first mark 13 and the second mark 14 passes through the marking component 12. For example, viewing towards the front surface 11$f$, the connection line S2 substantially overlaps a first long side 12$e$1 of the marking component 12. However, in another embodiment, viewing towards the front surface 11$f$, the connection line S2 passes through the region between the first long side 12$e$1 and the second long side 12$e$2 of the marking component 12.

In step S110, as indicated in FIG. 2C, the camera 110 captures a receiving component image M1 of the receiving component 10 from the front surface 11$f$ of the transmissive container 11; the receiving component image M1 includes a transmissive container image M11, a marking component image M12, a first mark image M13 and a second mark image M14.

Then, the image analyzer 120 performs a binary image processing operation on the receiving component image M1. For example, among the pixels of the receiving component image M1 of FIG. 2C, the image analyzer 120 sets the pixels of the edge image M11$e$ of the transmissive container image M11, the pixels of the marking component image M12, the pixels of the first mark image M13 and the pixels of the second mark image M14 as the first gray level, and sets the pixels other than the edge image M11$e$ of the transmissive container image M11, the pixels other than the marking component image M12, the pixels other than the first mark image M13 and the pixels other than the second mark image M14 as the second gray level. The second gray level and the first gray level are not the same. In the present embodiment as indicated in FIG. 2D, the first gray level is such as 0 (black, represented by a cross-section), and the second gray level is such as 255 (white, the region other than the cross-section). In another embodiment, the first gray level and/or the second gray level can be any value between 0~255. Refer to FIG. 2D. Due to the transmittance of the transmissive container 11, only the edge pixels of the transmissive container image M11 are set as the first gray level (the edge image M11$e$ has a darker color and is more obvious), and all or most of the remaining pixels of the transmissive container image M11 are set as the second gray level. Moreover, among the pixels of the receiving component image M1, the pixels of the background image B1 (illustrated in FIG. 2C) are also set as the first gray level (as indicated in FIG. 2D).

In step S120, as indicated in FIG. 2D, the image analyzer 120 analyzes the marking component image M12 downward from an end portion M12$a$ of the marking component image M12 to obtain a plurality of width values $W_i$ of a plurality of position points $P_i$ of the marking component image M12 as indicated in FIG. 2E, wherein the subscript i indicates the i-th position point. The value of the subscript i can be any positive integer between 1~m, wherein m represents a total number of position points $P_i$, and can be any positive integer. As indicated in FIG. 2D, the first position point $P_1$ is such as the position of an end portion M12$a$, and the last position point $P_m$ is such as the position of another end portion M12b of the marking component image M12. In the present embodiment, the end portion M12a is a top end of the marking component image M12, and the end portion M12b is a bottom end of the marking component image M12.

In an embodiment, one of the many methods by which the image analyzer 120 can obtain the width value $W_i$ is disclosed below.

As indicated in FIGS. 2D and 2E, at each position point $P_i$, the image analyzer 120 calculates the width value of each position point within a distance D1 from a starting point, being the connection line S2 connecting the first mark image M13 and the second mark image M14, towards a direction substantially perpendicular to the connection line S2 (such as in a direction towards the second long side image M12e2 of the marking component image M12 to cover the range of the marking component image M12), and calculates the width value $W_i$ of each position point $P_i$ within the range of the distance D1. The range of the distance D1 at least covers the second long side image M12e2 of the marking component image M12, but does not go beyond the edge image M11e of the transmissive container image M11. Since each pixel of the marking component image M12 is already set to the first gray level in the above step, at each position point $P_i$, the image analyzer 120 calculates a cumulative count of the pixels having the first gray level within the range of the distance D1, and determines the width value $W_i$ according to the cumulative count of pixels. The larger the number of pixels, the larger the width value $W_i$. The accumulated width image is illustrated in FIG. 2E.

Besides, since the first mark 13, the second mark 14 and the marking component 12 do not overlap at all, when calculating the cumulative count of the pixels of the marking component image M12, the number of the pixels of the first mark image M13 and the number of the pixels of the second mark image M14 will not be accumulated to the cumulative count of the pixels of the marking component image M12. Therefore, the width value $W_i$ is more accurate. Also, since the range of the distance D1 at least covers the second long side image M12e2 of the marking component image M12, the number of the pixels of the marking component image M12 will be accumulated to the cumulative count of the pixels of the marking component image M12. Since the distance D1 does not go beyond the edge image M11e of the transmissive container image M11, the number of the pixels of the edge image M11e will not be accumulated to the cumulative count of the pixels of the transmissive container image M11. Therefore, the width value $W_i$ is more accurate. To summarize, since the range of the distance D1 at least covers the second long side image M12e2 of the marking component image M12 but does not go beyond the edge image M11e of the transmissive container image M11, all or most of the accumulated pixels are the pixels of the marking component image M12 along the width. Therefore, the obtained width value $W_i$ is more accurate.

Additionally, since the image analyzer 120 calculates the width value $W_i$ within the range of the distance D1 in a direction substantially perpendicular to the connection line S2, the width value $W_i$ obtained when the receiving component 10 is inclined (for example, the extending direction of the marking component 12 is not parallel to the Z-axis) is similar or identical to the width value $W_i$ obtained when the receiving component 10 is not inclined (for example, the extending direction of the marking component 12 of FIG. 2B is substantially parallel to the Z-axis). In other words, since the image analyzer 120 calculates the width value $W_i$ within the range of the distance D1 in a direction substantially perpendicular to the connection line S2, an accurate or consistent determination result of the liquid level can be obtained without considering the relative position/angle between the image analyzer 120 and the receiving component 10. The Z-axis, which passes the geocentric center or is perpendicular to the ground. For the receiving component image M1 or the transmissive container image M11, the Z-axis is the vertical line.

In step S130, the image analyzer 120 calculates a plurality of width values $W_i$ according to equation (1) to obtain a width average $W_{av}$. In equation (1), m represents a total number of position points, and can be any positive integer equivalent to or greater than 1.

$$W_{av} = \left(\sum_{i=1}^{i=m} W_i\right) / m \tag{1}$$

The liquid level detecting method according to a plurality of embodiments of the present disclosure is disclosed below.

Figure 3:
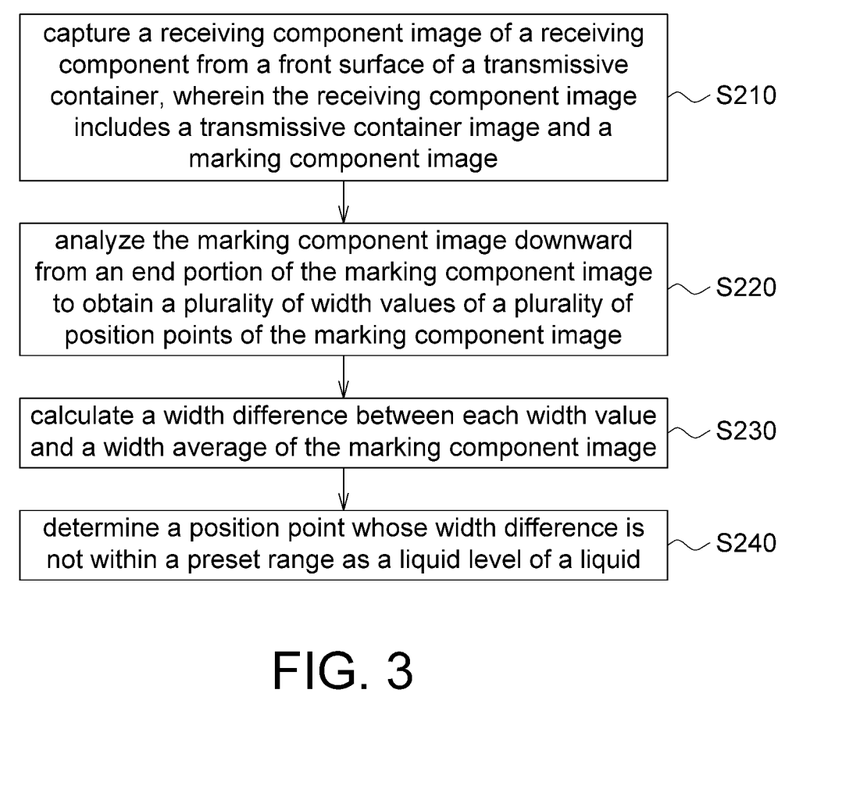
FIG. 3 is a flowchart of a liquid level detecting method according to an embodiment of the present disclosure.
Figure 4B:
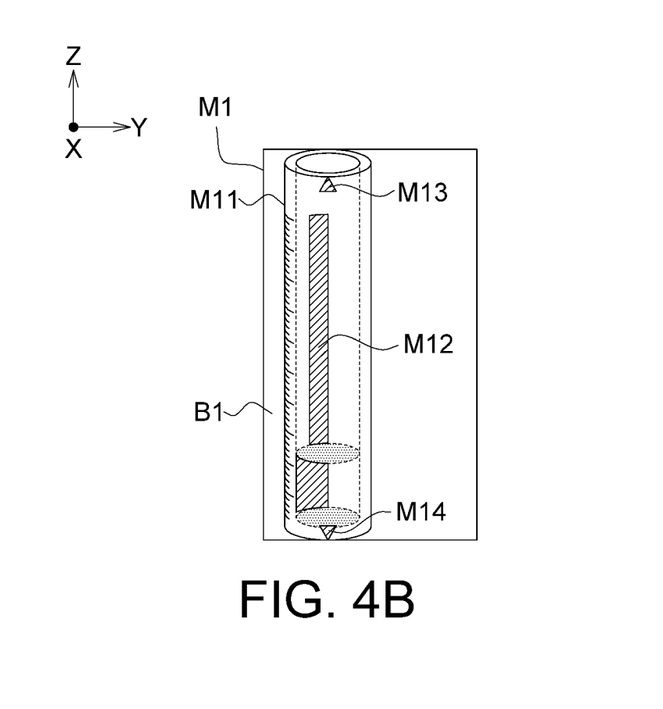
FIG. 4B is a schematic diagram of a receiving component image captured by the camera of FIG. 4A from a front surface of the transmitting container.
Figure 4C:
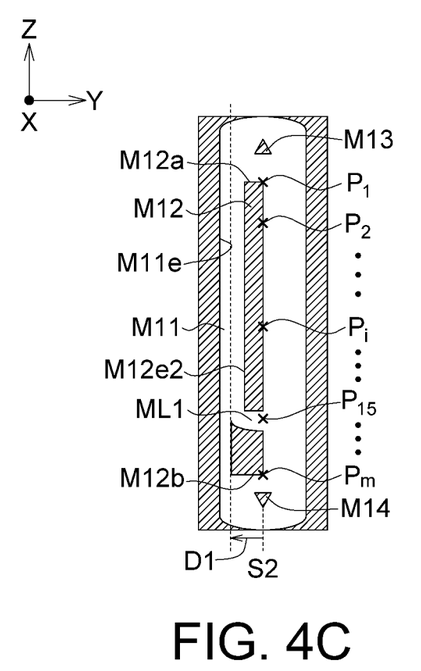
FIG. 4C is a schematic diagram of the marking component image, the first mark image and the second mark image of FIG. 4B.
Figure 4D:
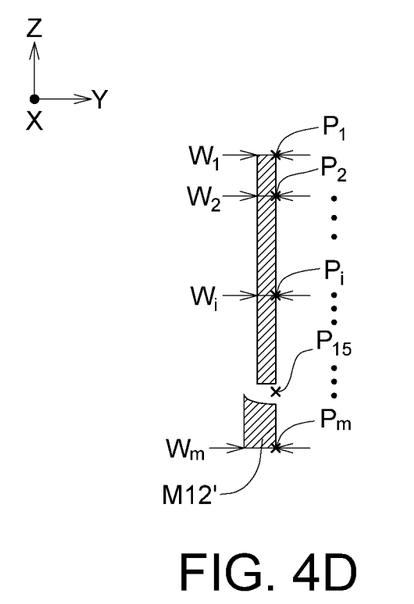
FIG. 4D is a schematic diagram of width change in the marking component image of FIG. 4C.

Refer to FIG. 3 and FIGS. 4A~4D. FIG. 3 is a flowchart of a liquid level detecting method according to an embodiment of the present disclosure. FIG. 4A is a schematic diagram of the liquid contained in the transmissive container of FIG. 2A being at a low liquid level. FIG. 4B is a schematic diagram of a receiving component image M1 captured by the camera of FIG. 4A from a front surface 11f of the transmitting container. FIG. 4C is a schematic diagram of the marking component image M12, the first mark image M13 and the second mark image M14 of FIG. 4B. FIG. 4D is a schematic diagram of width change in the marking component image M12 of FIG. 4C.

As indicated in FIG. 4A, the liquid level detecting device 200 includes a camera 110, an image analyzer 120 and a liquid level determiner 230. The liquid level determiner 230 electrically connects the camera 110 and the image analyzer 120 for determining a position point whose width difference is not within a preset range (here below referred as "point having abrupt change in width"), and then determining a liquid level of the liquid L1 according to the point having abrupt change in width. In an embodiment, the image analyzer 120 and/or the liquid level determiner 230 can be realized by circuits formed by a semiconductor process or can be integrated as a circuit. Also, the image analyzer 120 and the liquid level determiner 230 can be integrated as a processor or integrated to the central processing unit (CPU).

In step S210, as indicated in FIG. 4B, the camera 110 captures a receiving component image M1 of the receiving component 10 from a front surface 11f of the transmissive container 11, wherein the receiving component image M1 includes a transmissive container image M11, a marking component image M12, a first mark image M13 and a second mark image M14. As indicated in FIG. 4B, the part of the marking component image M12 being blocked by the liquid L1 is magnified due to the refractive index of the liquid L1. Then, the image analyzer 120 performs a binary image processing operation on the receiving component image M1.

As indicated in FIG. 4C, among the pixels of the receiving component image M1, the image analyzer 120 sets the pixels of the edge image M11e of the transmissive container image M11, the pixels of the marking component image M12, the pixels of the first mark image M13 and the pixels of the second mark image M14 as the first gray level, and sets the pixels other than the edge image M11e of the transmissive container image M11, the pixels other than the marking component image M12, the pixels other than the first mark image M13 and the pixels other than the second mark image M14 as the second gray level. The second gray level and the first gray level are not the same. In the present embodiment as indicated in FIG. 4C, the first gray level is such as 0 (black, represented by a cross-section), and the second gray level is such as 255 (white, the region other than the cross-section). In another embodiment, the first gray level and/or the second gray level can be any value between 0~255. Refer to FIG. 4C. Due to the transmittance of the transmissive container 11 and the liquid L1, only the edge pixels of the transmissive container image M11 are set as the first gray level (the edge image M11e has a darker color and is more obvious), and all or most of the remaining pixels of the transmissive container image M11 are set as the second gray level. Moreover, among the pixels of the receiving component image M1, the pixels of the background image B1 (the background image B1 illustrated in FIG. 4B) are also set as the first gray level (as indicated in FIG. 4C).

In step S220, as indicated in FIGS. 4C and 4D, the image analyzer 120 analyzes the marking component image M12 downward from an end portion M12a of the marking component image M12 to obtain a plurality of width values $W_i$ of a plurality of position points $P_i$ of the marking component image M12, wherein the subscript i indicates the i-th position point. As indicated in FIG. 4C, the first position point $P_1$ is such as the position of an end portion M12a, the last position point $P_m$ is such as the position of another end portion M12b of the marking component image M12. In the present embodiment, the end portion M12a is a top end of the marking component image M12, and the end portion M12b is a bottom end of the marking component image M12.

In an embodiment, one of the many methods by which the image analyzer 120 can obtain the width value $W_i$ is disclosed below.

At each position point $P_i$, the image analyzer 120 calculates the width value of each position point within a distance D1 from a starting point, being the connection line S2 connecting the first mark image M13 and the second mark image M14, towards a direction substantially perpendicular to the connection line S2 (such as in a direction towards the second long side image M12e2 of the marking component image M12 to cover the range of the marking component image M12), and calculates the width value $W_i$ of each position point $P_i$ within the range of the distance D1. Since each pixel of the marking component image M12 is already set to the first gray level in the above step, at each position point $P_i$, the image analyzer 120 calculates a cumulative count of the pixels having the first gray level within the range of the distance D1, and determines the width value $W_i$ according to the cumulative count of pixels. The larger the number of pixels, the larger the width value $W_i$. The accumulated width image is illustrated in FIG. 4D.

Besides, since the image analyzer 120 calculates the width value $W_i$ of each position point $P_i$ within the range of the distance D1 in a direction substantially perpendicular to the connection line S2, the width value $W_i$ obtained when the receiving component 10 is inclined (for example, the extending direction of the marking component 12 is not parallel to the Z-axis) is similar or identical to the width value $W_i$ obtained when the receiving component 10 is not inclined (for example, the extending direction of the marking component 12 of FIG. 2B is substantially parallel to the Z-axis).

In step S230, the image analyzer 120 calculates a width difference $W_{d,i}$ between each width value $W_i$ and a width average $W_{av}$ of the marking component image M12, wherein the subscript i of the width difference $W_{d,i}$ indicates the width difference at the position point $P_i$. The width difference $W_{d,i}$ at the position point $P_i$ is calculated according to equation (2).

$$W_{d,i}=W_i/W_{av} \qquad (2)$$

In step S240, the liquid level determiner 230 determines a position point $P_i$ whose width difference $W_{d,i}$ is not within a preset range as a liquid level of the liquid L1. In the present embodiment, the preset range is between a lower limit and an upper limit, wherein the lower limit is such as 0.1 or below, and the upper limit is such as 1.5 or above.

Furthermore, as indicated in equation (2), when the width difference $W_{d,i}$ is smaller than the lower limit, this implies that the liquid L1 contained in the transmissive container 11 is at a low liquid level; when the width difference $W_{d,i}$ is greater than the upper limit, this implies that the liquid L1 contained in the transmissive container 11 is at a medium liquid level. In the present embodiment as indicated in FIG. 4C, when the liquid L1 contained in the transmissive container 11 is at the low liquid level, the image of the liquid L1 captured by the camera 110 is transmissive, and the transmissive container image M11 includes a transmissive image ML1 of the liquid L1 (the pixels of the transmissive image ML1 are at the second gray level). Under such circumstance, the width image of FIG. 4D (the width represents the number of pixels having the first gray level) will have a point having abrupt change in width, such as position point $P_{15}$, and the width difference $W_{d,i}$ at the position point $P_{15}$ is smaller than the lower limit.

In the present step, as indicated in FIG. 4D, the liquid level determiner 230 sequentially analyzes the width difference $W_{d,i}$ at the position point $P_i$ of the marking component width image M12' downward, and determines a point having abrupt change in width (such as position point $P_{15}$) according to the change in the width difference $W_{d,i}$. The point having abrupt change in width corresponds to a liquid level of the liquid L1.

In the present step, the liquid level determiner 230 can determine the corresponding liquid level value of the liquid L1 at the position point $P_{15}$ by looking up a table (not illustrated). In an embodiment, the table includes the correspondence relationship between a plurality of position points $P_{15}$ and a plurality of liquid level values, wherein the height of the liquid level corresponds to the scale 11a (illustrated in FIG. 2B) of the transmissive container 11. In other words, the liquid level value at the position point $P_{15}$ determined by the liquid level determiner 230 is consistent with the scale value of the liquid level of the liquid L1 contained in the transmissive container 11. For example, if the liquid level value at the position point $P_{15}$ determined by the liquid level determiner 230 is 5 ml, this implies that the scale value of the liquid level of the liquid L1 contained in the transmissive container 11 is also 5 ml or near 5 ml. The abovementioned table can be obtained through experiments or simulation, and can be stored in a storage unit inside or outside the liquid level determiner 230.

In another embodiment, the liquid level determiner 230 determines whether the liquid level value reaches a preset liquid level value. When the liquid level value reaches the preset liquid level value, the liquid level determiner 230 can emit a signal to notify the medical staff to be on site and perform a corresponding operation such as a corresponding medical order. In an embodiment, the liquid level detecting device 100 further includes a notifier (not illustrated), which emits a notification signal according to the signal of the liquid level determiner 230 to notify the medical staff to be on site and perform a corresponding operation. The notifier can be realized by such as a sound generator, a display, or a vibrator, and the notification signal can be realized by such as sound, image, or vibration.

Figure 5A:
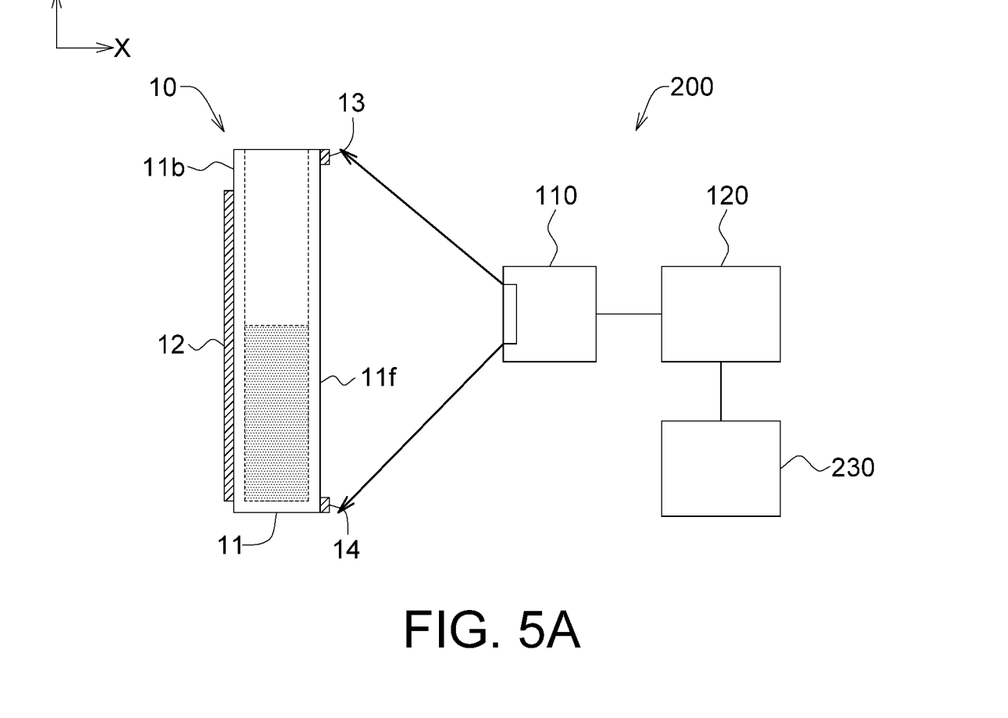
FIG. 5A is a schematic diagram of the liquid contained in the transmissive container of FIG. 2A being at a medium liquid level.
Figure 5B:
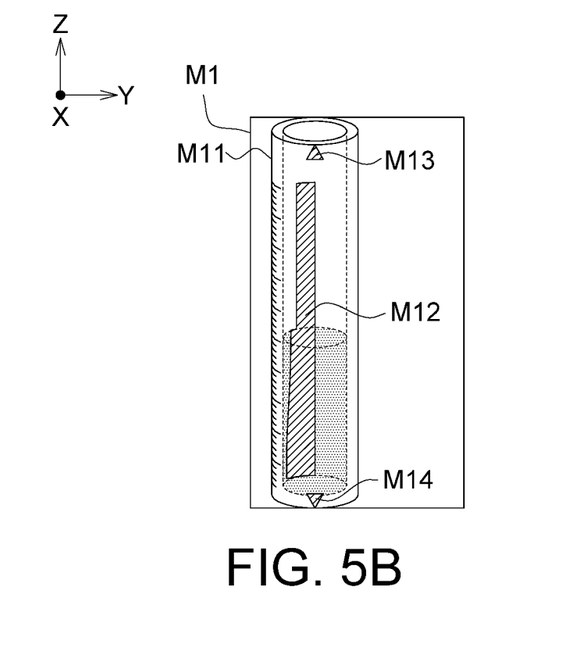
FIG. 5B is a schematic diagram of receiving component image captured by the camera of FIG. 5A from a front surface of the transmitting container.
Figure 5C:
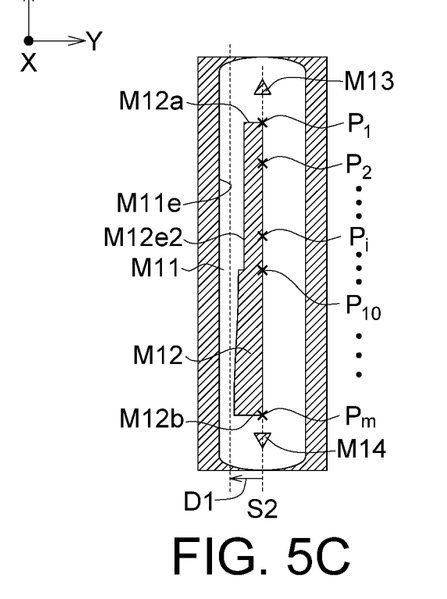
FIG. 5C is a schematic diagram of the marking component image, the first mark image and the second mark image of FIG. 5A.
Figure 5D:
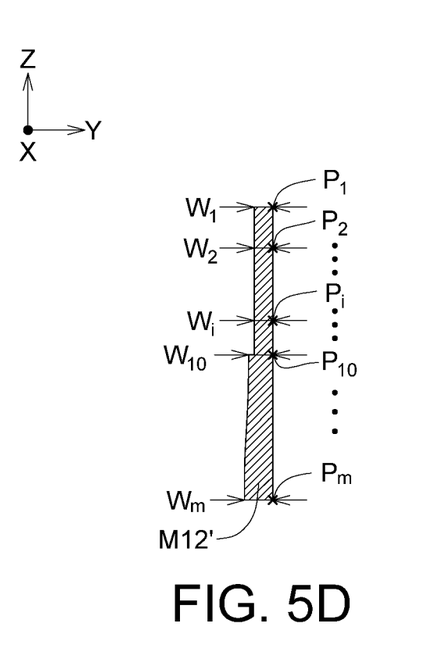
FIG. 5D is a schematic diagram of width change in the marking component image of FIG. 5C.

Refer to FIG. 3 and FIGS. 5A-5D. FIG. 5A is a schematic diagram of the liquid L1 contained in the transmissive container of FIG. 2A being at a medium liquid level. FIG. 5B is a schematic diagram of receiving component image M1 captured by the camera of FIG. 5A from a front surface 11f of the transmitting container. FIG. 5C is a schematic diagram of the marking component image M12, the first mark image M13 and the second mark image M14 of FIG. 5A. FIG. 5D is a schematic diagram of width change in the marking component image M12 of FIG. 5C.

The steps of the liquid level detecting method of the present embodiment are similar or identical to that of FIGS. 4A-4D, and the difference lies in the determination result of step S240.

In step S240 of the present embodiment, the liquid level determiner 230 determines a position point $P_i$ whose width difference value is not within a preset range (that is, the point having abrupt change in width) as a liquid level. As indicated in FIG. 5D, the liquid level determiner 230 sequentially analyzes the width difference $W_{d,i}$ at the position point $P_i$ of the marking component width image M12' downward, and determines a point having abrupt change in width (such as position point $P_{10}$) according to the width difference $W_{d,i}$. The point having abrupt change in width corresponds to a liquid level of the liquid L1. In the present step, the liquid level determiner 230 can determine a corresponding liquid level value of the liquid L1 at the position point $P_{10}$ by looking up a table similar or identical the abovementioned table.

Figure 6A:
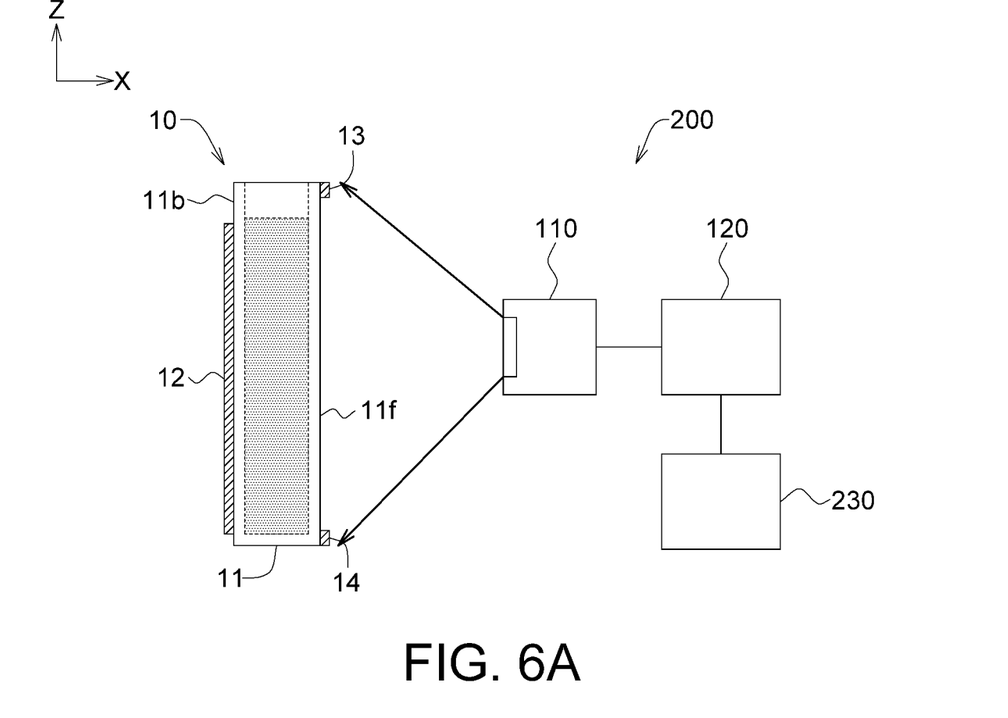
FIG. 6A is a schematic diagram of the liquid contained in the transmissive container of FIG. 2A being at a medium liquid level.
Figure 6B:
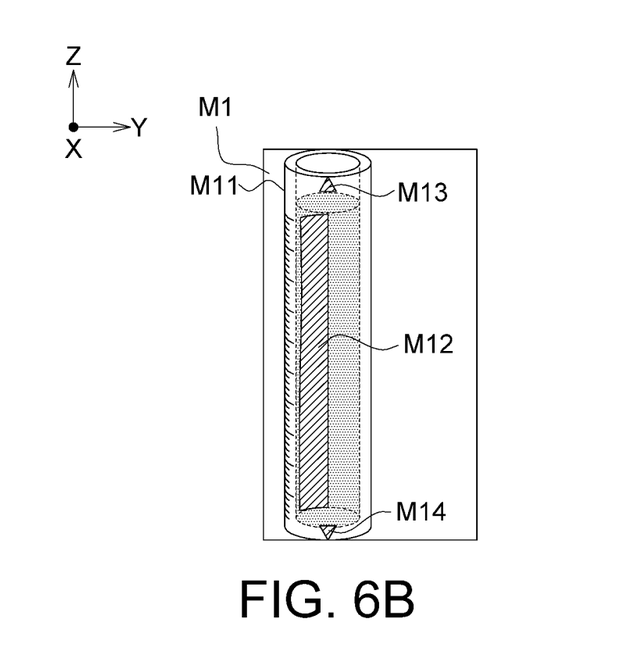
FIG. 6B is a schematic diagram of a receiving component image captured by the camera of FIG. 6A from a front surface of the transmitting container captures.
Figure 6C:
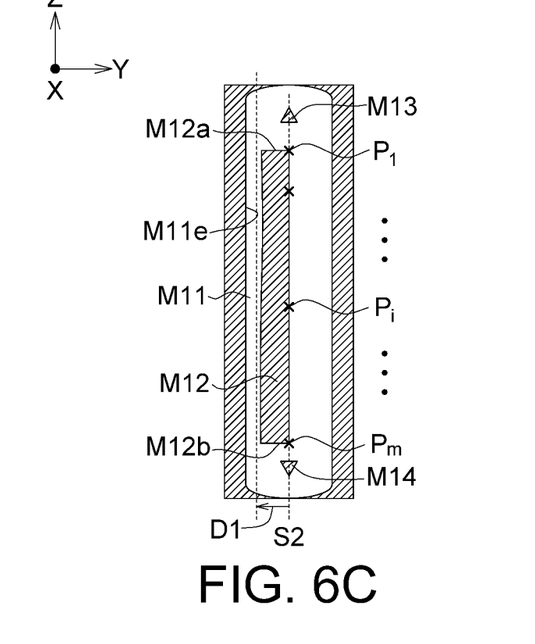
FIG. 6C is a schematic diagram of the marking component image, the first mark image and the second mark image of FIG. 6A.
Figure 6D:
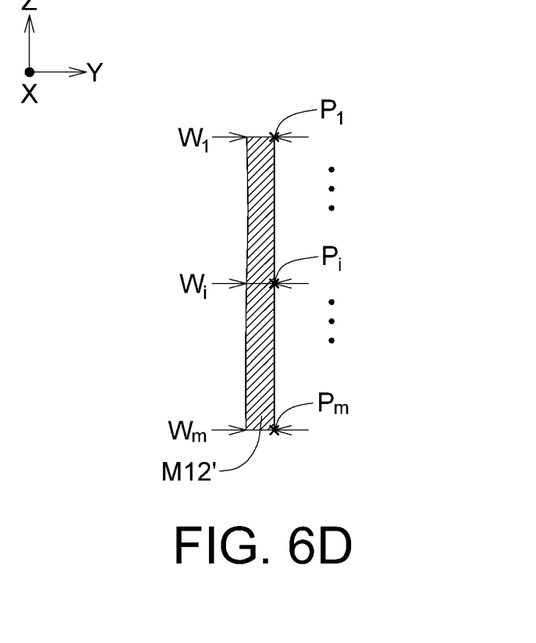
FIG. 6D is a schematic diagram of width change in the marking component image of FIG. 6C.

Refer to FIG. 3 and FIGS. 6A-6D. FIG. 6A is a schematic diagram of the liquid L1 contained in the transmissive container of FIG. 2A being at a medium liquid level. FIG. 6B is a schematic diagram of a receiving component image M1 captured by the camera of FIG. 6A from a front surface 11f of the transmitting container captures. FIG. 6C is a schematic diagram of the marking component image M12, the first mark image M13 and the second mark image M14 of FIG. 6A. FIG. 6D is a schematic diagram of width change in the marking component image M12 of FIG. 6C.

The steps of the liquid level detecting method of the present embodiment are similar or identical to that of FIGS. 4A~4D, and the difference lies in the determination result of step S240.

In step S240 of the present embodiment, the liquid level determiner 230 determines a position point $P_i$ whose width difference value is not within a preset range (that is, the point having abrupt change in width) as a liquid level. As indicated in FIG. 6D, the liquid level determiner 230 determines a position point $P_i$ whose width difference value is not within a preset range (that is, the point having abrupt change in width) as a liquid level. As indicated in FIG. 5D, the liquid level determiner 230 sequentially analyzes the width difference $W_{d,i}$ at the position point $P_i$ of the marking component width image M12' downward, and determines a point having abrupt change in width (such as the position point $P_i$) according to the width difference $W_{d,i}$. The point having abrupt change in width corresponds to a liquid level of the liquid L1. In the present step, the liquid level determiner 230 can determine a corresponding liquid level value of the liquid L1 at the position point $P_1$ by looking up a table similar or identical the abovementioned table. Since the liquid level corresponds to the first position point (i=1), the liquid level determiner 230 can determine that the liquid L1 contained in the transmissive container 11 is at a full water level.

In another embodiment, when the point having abrupt change in width is the last position point $P_m$, this implies that the liquid L1 contained in the transmissive container 11 is completely or nearly depleted. Additionally, when each width difference $W_{d,i}$ is within the preset range, that is, no point has abrupt change in width, this implies that that the liquid L1 contained in the transmissive container 11 is completely or nearly depleted.

Along with the change in the liquid level, the liquid level detecting device can obtain a plurality of marking component width images at different time points, analyze a plurality of points having abrupt change in width of the marking component width image, and determine the height trend of the liquid level of the liquid L1 contained in the transmissive container 11 according to the trend of the point having abrupt change in width. For example, the point having abrupt change in width at the first time point is $P_5$, and the point having abrupt change in width at the second time point is $P_{10}$. This implies that the liquid level of the liquid L1 contained in the transmissive container 11 at the first time point is higher than the liquid level of the liquid L1 contained in the transmissive container 11 at the second time point. Thus, the liquid level determiner 230 can determine the change rate of the liquid L1 contained in the transmissive container 11 (such as the rising rate or the falling rate of the liquid level) according to the difference in the liquid level of the liquid L1 contained in the transmissive container 11 within a time difference.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid level detecting method, comprising:
   capturing a transmissive container image of a transmissive container and a marking component image of a marking component from a front surface of a transmissive container by a camera, wherein the transmissive container is configured for containing a liquid, and the marking component is located on a rear surface of the transmissive container;
   analyzing the marking component image downward from an end portion of the marking component image to obtain a plurality of width values of a plurality of position points of the marker component image;
   obtaining a width difference between each width value and a width average of the marking component image; and
   determining the position point whose width difference is not within a preset range as a liquid level of the liquid.

2. The liquid level detecting method according to claim 1, further comprising:
   setting each of pixels of the transmissive container image and the marking component image to a first gray level; and setting each of pixels other than the pixels of the transmissive container image and the marking component image to a second gray level different from the first gray level;

wherein the step of obtaining the width values of the position points of the marking component image comprises:

at each position point, calculating a cumulative count of the pixels of the marking component image that have the first gray level and determining the width value according to the cumulative count of pixels.

3. The liquid level detecting method according to claim 2, wherein the first gray level is 0, and the second gray level is 255.

4. The liquid level detecting method according to claim 1, wherein a first mark and a second mark are located on a front surface of the transmissive container; the step of capturing the transmissive container image from the front surface by the camera further comprises capturing a first mark image of the first mark and a second mark image of the second mark; the step of analyzing the marking component image downward from an end portion of the marking component image further comprises:

at each position point, calculating the width value of each position point from a starting point, being a connection line connecting the first mark image and the second mark image, towards a direction substantially perpendicular to the connection line.

5. The liquid level detecting method according to claim 4, wherein the step of calculating the width value of each position point further comprises:

at each position point, calculating the width value within the range of a distance towards a direction substantially perpendicular to the connection line.

6. The liquid level detecting method according to claim 1, the first mark and the second mark are located on a front surface of the transmissive container; the extending direction of the marking component is substantially parallel to the direction of a connection line connecting the first mark and the second mark.

7. The liquid level detecting method according to claim 6, wherein the first mark is a first triangle; the second mark is a second triangle; the bottom side of the first mark and the bottom side of the second mark are opposite to each other.

8. The liquid level detecting method according to claim 6, wherein the connection line connecting the first mark and the second mark passes through the marking component.

9. The liquid level detecting method according to claim 6, wherein the first mark, the second mark and the marking component are separated from one another.

10. The liquid level detecting method according to claim 1, wherein the preset range is between 0.1~1.5.

11. A liquid level detecting device for detecting a liquid level of a liquid contained in a transmissive container, wherein a marking component is located on a rear surface of the transmissive container, and the liquid level detecting device comprises:

a camera for capturing a transmissive container image of a transmissive container and a marking component image of a marking component from a front surface of a transmissive container;

an image analyzer for:

analyzing the marking component image downward from an end portion of the marking component image to obtain a plurality of width values of a plurality of position points of the marker component image; and obtaining a width difference between each width value and a width average of the marking component image; and a liquid level determiner configured for:

determining the position point whose width difference is not within a preset range as the liquid level of the liquid.

12. The liquid level detecting device according to claim 11, wherein the image analyzer further is configured for:

setting each of the pixels of the transmissive container image and the marking component image to a first gray level; and setting each of the pixels other than the pixels of the transmissive container image and the marking component image to a second gray level different from the first gray level;

wherein the step of obtaining the width values of the position points of the marking component image comprises:

at each position point, calculating a cumulative count of the pixels of the marking component image that have the first gray level and determining the width value according to the cumulative count of pixels.

13. The liquid level detecting device according to claim 12, wherein the first gray level is 0, and the second gray level is 255.

14. The liquid level detecting device according to claim 11, wherein a first mark and a second mark are located on a front surface of the transmissive container; the camera further is configured for capturing a first mark image of the first mark and a second mark image of the second mark from the front surface of the transmissive container; the image analyzer further is configured for:

at each position point, calculating the width value of each position point from a starting point, being a connection line connecting the first mark image and the second mark image, towards a direction substantially perpendicular to the connection line.

15. The liquid level detecting device according to claim 14, wherein the image analyzer further is configured for:

at each position point, calculating the width value within the range of a distance towards a direction substantially perpendicular to the connection line.

16. The liquid level detecting device according to claim 11, wherein a first mark and a second mark are located on a front surface of the transmissive container; the extending direction of the marking component is substantially parallel to the direction of a connection line connecting the first mark and the second mark.

17. The liquid level detecting device according to claim 16, wherein the first mark is a first triangle; the second mark is a second triangle; the bottom side of the first mark and the bottom side of the second mark are opposite to each other.

18. The liquid level detecting device according to claim 16, wherein the connection line connecting the first mark and the second mark passes through the marking component.

19. The liquid level detecting device according to claim 16, wherein the first mark, the second mark and the marking component are separated from one another.

20. The liquid level detecting device according to claim 11, wherein the preset range is between 0.1~1.5.

* * * * *